(12) United States Patent
Miro-Padovani et al.

(10) Patent No.: US 10,293,835 B2
(45) Date of Patent: May 21, 2019

(54) METHOD FOR ENERGY MANAGEMENT IN A HYBRID MOTOR VEHICLE

(71) Applicant: RENAULT S.A.S., Boulogne-Billancourt (FR)

(72) Inventors: Thomas Miro-Padovani, Maurepas (FR); Abdel-Djalil Ourabah, Paris (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 15/757,804

(22) PCT Filed: Aug. 24, 2016

(86) PCT No.: PCT/FR2016/052112
§ 371 (c)(1),
(2) Date: Mar. 6, 2018

(87) PCT Pub. No.: WO2017/042447
PCT Pub. Date: Mar. 16, 2017

(65) Prior Publication Data
US 2018/0244280 A1 Aug. 30, 2018

(30) Foreign Application Priority Data

Sep. 7, 2015 (FR) ...................................... 15 58296

(51) Int. Cl.
*B60W 50/06* (2006.01)
*B60W 50/00* (2006.01)
(Continued)

(52) U.S. Cl.
CPC ........ *B60W 50/0097* (2013.01); *B60W 10/06* (2013.01); *B60W 10/08* (2013.01);
(Continued)

(58) Field of Classification Search
CPC .. B60W 50/06; B60W 50/0097; B60W 20/12; B60W 10/06; B60W 10/08; Y02T 10/6291; G06F 19/00
(Continued)

(56) References Cited

U.S. PATENT DOCUMENTS

2007/0056784 A1* 3/2007 Joe ........................... B60K 6/48
180/65.245
2015/0158485 A1* 6/2015 Kawasaki .............. B60K 6/445
477/5
(Continued)

FOREIGN PATENT DOCUMENTS

DE 10 2013 224 349 B3 3/2015
EP 2 857 271 A2 4/2015
(Continued)

OTHER PUBLICATIONS

International Search Report dated Nov. 10, 2016 in PCT/FR2016/052112 filed Aug. 28, 2016.
(Continued)

*Primary Examiner* — Tan Q Nguyen
(74) *Attorney, Agent, or Firm* — Oblon, McClelland, Maier & Neustadt, L.L.P.

(57) ABSTRACT

A method is for energy management in a hybrid motor vehicle that includes a power plant coupled with wheels of the vehicle via a transmission according to at least two modes, one of which is currently in use. The method includes determining a quantity of energy representing energy consumption of the power plant and selecting one of the transmission modes according to the quantity of energy. The selecting includes determining a parameter representing an imminent change in torque demand at the wheels, determining a correction factor of the quantity of energy according to the transmission mode currently in use and according to the parameter which represents an imminent change in torque demand, determining a corrected quantity of energy equal to the sum of the quantity of energy plus the correction factor, and selecting the transmission mode in order to minimize the corrected quantity of energy.

9 Claims, 2 Drawing Sheets

Figure 4:
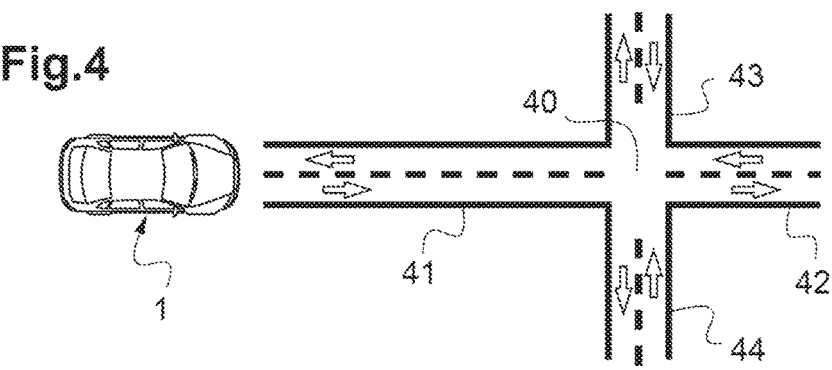

(51) Int. Cl.
*B60W 10/06* (2006.01)
*B60W 10/08* (2006.01)
*B60W 20/20* (2016.01)
*B60W 20/12* (2016.01)
*G06F 19/00* (2018.01)
*B60W 20/00* (2016.01)

(52) U.S. Cl.
CPC ............ B60W 20/12 (2016.01); B60W 20/20 (2013.01); B60W 50/06 (2013.01); *B60W 20/00* (2013.01); *B60W 2520/10* (2013.01); *B60W 2540/20* (2013.01); *B60W 2550/143* (2013.01); *B60W 2550/146* (2013.01); *B60W 2550/402* (2013.01); *Y02T 10/6291* (2013.01)

(58) Field of Classification Search
USPC ...................................................... 701/22, 51
See application file for complete search history.

(56) References Cited

U.S. PATENT DOCUMENTS

| | | | | |
|---|---|---|---|---|
| 2016/0237651 A1* | 8/2016 | Miyamoto | ............ | B60W 20/30 |
| 2016/0297422 A1 | 10/2016 | Jehle et al. | | |
| 2017/0066437 A1* | 3/2017 | Yamamoto | ............... | B60K 6/48 |
| 2018/0143037 A1* | 5/2018 | Kamel | ................ | H02J 13/0006 |

FOREIGN PATENT DOCUMENTS

FR     2 935 123 A1    2/2010
WO   2015/110129 A1   7/2015

OTHER PUBLICATIONS

Foreign Search Report dated Mar. 22, 2016 in French Application No. FR 15 58296 filed Sep. 7, 2015.

* cited by examiner

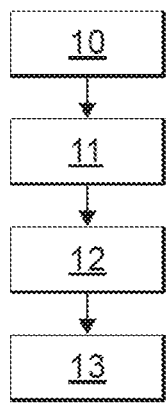
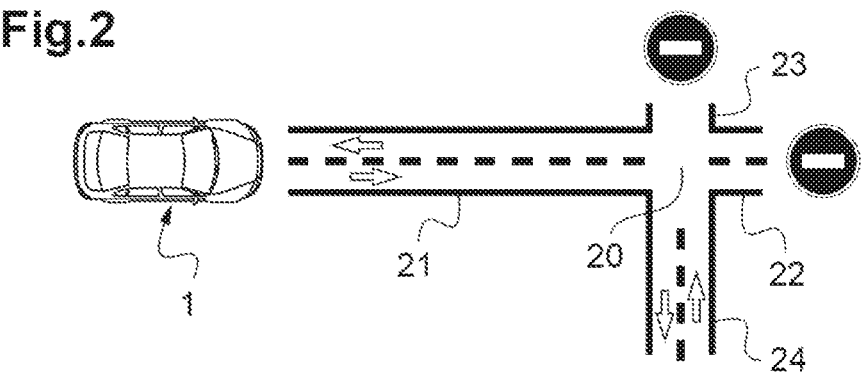
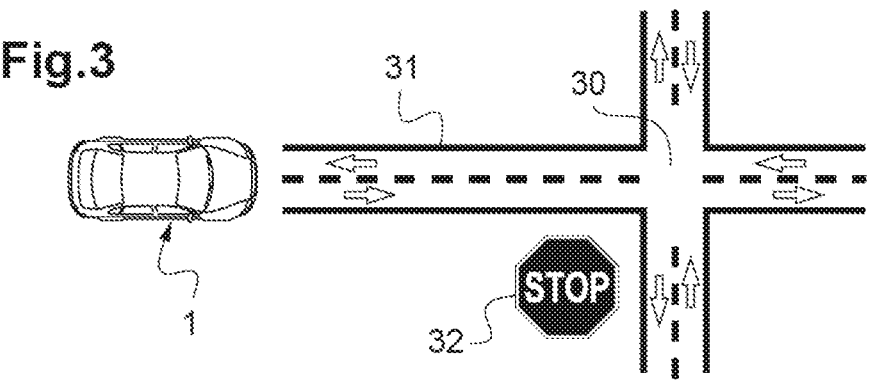

METHOD FOR ENERGY MANAGEMENT IN A HYBRID MOTOR VEHICLE

TECHNICAL FIELD TO WHICH THE INVENTION RELATES

The present invention relates to a method for energy management in a hybrid motor vehicle comprising a power plant that includes a heat engine and an electric motor suitable for being coupled with wheels of the vehicle via a transmission device according to at least two transmission modes, one of which is currently in use, wherein a) a quantity of energy is determined which represents the energy consumption of the power plant, and b) one of said transmission modes is selected according to this quantity of energy.

TECHNOLOGICAL BACKGROUND

In a hybrid motor vehicle, the power plant is equipped with a heat engine and at least one electric motor, so that several distinct transmission modes can be implemented by a transmission device of this power plant, in order to couple one or more of these engines/motors with the driving wheels of the vehicle.

First of all, it is possible to choose to couple only one of these two engines/motors, or both engines/motors, with the driving wheels of the vehicle, and in fact, for each one of these engines/motors, with a gear ratio that is specific to it.

In a hybrid transmission mode, for example, the heat engine as well as the electric motor are coupled with the driving wheels of the vehicle. In such a hybrid transmission mode, the heat engine and the electric motor can therefore both contribute to propelling the vehicle, in particular when high torque must be exerted at the wheels of the vehicle. The heat engine can also, in such a hybrid transmission mode, provide this propulsion alone, while the electric motor remains coupled with the driving wheels in order to recharge the electric battery intended to power it.

In contrast, in a transmission mode corresponding to all electric functioning, only the electric motor is coupled with the driving wheels of the vehicle. This all electric transmission mode is particularly advantageous in braking phase. In effect, in this case, the kinetic energy of the vehicle can be recovered at least partially in electrical form by means of the electric motor, while the heat engine is uncoupled from the wheels of the vehicle and consumes no energy.

On the other hand, when the heat engine and the electric motor are both coupled with the driving wheels of the vehicle, the torque to produce in order to satisfy the torque demand from the driver can be shared, in variable proportions, between these two engines/motors.

Among the different transmission modes that can therefore be used, the transmission mode to implement is generally selected according to the functioning conditions of the vehicle, so as advantageously to minimize the energy consumption of this vehicle.

But such a selection of the transmission mode, based only on minimizing energy consumption, can bring about particularly frequent changes of transmission mode, which is annoying for the users of the vehicle and is not accompanied by any substantial reduction of the energy consumption of the vehicle.

In order to resolve this problem, a method is known in particular from document FR3014062 for energy management in a hybrid motor vehicle, in which the transmission mode to implement is chosen so as to minimize a mixed quantity of energy, which is the sum of a quantity of energy representing the energy consumption of the vehicle plus an annoyance value taking into account the annoyance of a change of transmission mode for the users of the vehicle, this method making it possible to limit the frequency of such changes of transmission mode.

But, when such a management method is used, inappropriate changes of transmission mode can persist, in particular rapid sequences of changes of transmission mode, during which the vehicle changes transmission mode for a very brief period, which is not accompanied by any substantial energy saving.

OBJECT OF THE INVENTION

In order to remedy the abovementioned disadvantage of the prior art, the present invention proposes a new method for energy management in a hybrid motor vehicle, making it possible efficiently to limit changes of transmission mode close together in time.

More precisely, the invention proposes a method for energy management in a hybrid motor vehicle as defined in introduction, wherein, at step b), b1) a parameter is determined which represents an imminent change in torque demand at the wheels, b2) a correction factor of said quantity of energy is determined according to the transmission mode currently in use and according to said parameter which represents an imminent change in torque demand, b3) a corrected quantity of energy is determined which is equal to the sum of said quantity of energy plus said correction factor, b4) the transmission mode is selected in order to minimize said corrected quantity of energy.

The applicant has effectively found that sequences of rapid changes of transmission mode take place in particular during changes in torque demand, generally related to changes of speed of this vehicle.

The method according to the invention therefore authorizes imminent changes in torque demand of the vehicle to be taken into account in order to limit the occurrence of these rapid sequences of changes of transmission mode.

In particular, thanks to the invention, imminent changes in torque demand (in particular, imminent changes in the speed of the vehicle) are taken into account in the process for selecting the transmission mode to use, in order to avoid a change of transmission mode which would be unnecessary, because immediately followed by another change of transmission mode, due for example to the effective change of speed of the vehicle.

For example, thanks to the invention, when a motor vehicle approaches a zone where it must slow down, for example an intersection, and when the transmission mode currently in use is an all electric transmission mode, the method according to the invention makes it possible to avoid switching to a hybrid transmission mode, since the all electric transmission mode already currently in use is more advantageous in terms of energy during the braking phase than a hybrid transmission mode.

Switching to the hybrid transmission mode just before braking would therefore bring about a first change of transmission mode, which may entail starting the heat engine when the latter is switched off in all electric transmission mode, followed almost immediately by a second change of transmission mode in order to switch to an all electric transmission mode at the start of braking.

In a comparable manner, thanks to the invention, when a motor vehicle is about to accelerate, for example, in order to pass another vehicle, and when the transmission mode currently in use is a hybrid transmission mode, the method according to the invention makes it possible to avoid a switch to an all electric transmission mode, since the hybrid transmission mode already in use is more advantageous in terms of energy during the acceleration phase than the all electric transmission mode.

Switching to the all electric transmission mode just before accelerating would therefore bring about a first change of transmission mode, followed almost immediately by a second change of transmission mode, with the heat engine restarted in order to switch to a hybrid transmission mode at the start of accelerating.

The parameter which represents an imminent change in torque demand is therefore for example a parameter which represents an imminent change of speed of the vehicle.

However, it is noted that the change in torque demand does not necessarily result from a change of speed. Such a change in torque demand may also result for example from a change of slope of the road traveled by the vehicle at constant speed.

According to the invention, the selection of the transmission mode used is furthermore based on minimizing the energy consumption, which makes it possible to obtain an optimum compromise between reduced energy consumption and functioning conditions that are comfortable for the users of the vehicle.

On the other hand, this method may be implemented in a vehicle by purely software means, based only on data or signals already available in a motor vehicle, in particular when it is equipped with a global positioning system (GPS). The implementation of this method then advantageously requires no specific additional part or sensor.

Preferably, during the method for energy management according to the invention, at step a), an initial value of said quantity of energy is determined for each transmission mode, this quantity representing the energy consumption of the power plant; at step b2), a value of said correction factor associated with this transmission mode is determined for each transmission mode; at step b3), a final value of said corrected quantity of energy associated with this same transmission mode is determined for each transmission mode and at step b4), the transmission mode is selected which has the lowest final value of the corrected quantity of energy associated with this transmission mode.

It is also possible to envisage that each transmission mode is associated with a gear ratio and/or with a division of torque between the heat engine and the electric motor.

Other non-limitative and advantageous features of a method for energy management in accordance with the invention are as follows:

said transmission modes comprising at least one hybrid transmission mode wherein the heat engine and the electric motor are both coupled with the wheels of the vehicle, and an all electric transmission mode wherein the electric motor alone is coupled with the wheels of the vehicle when the transmission mode currently in use is the all electric transmission mode and when said parameter determined at step b1) represents an imminent decrease in torque demand, then, at step b2), said correction factor is determined so as to have a higher value for the hybrid transmission mode than for the all electric transmission mode;

when the transmission mode currently in use is the hybrid transmission mode and when said parameter determined at step b1) represents an imminent increase in torque demand, then, at step b2), said correction factor is determined so as to have a higher value for the all electric transmission mode than for the hybrid transmission mode;

said correction factor is proportional to said quantity of energy;

the vehicle furthermore comprising a global positioning system suitable for supplying information on the position of the vehicle and digitized cartographic data, at step b1), said parameter which represents an imminent change in torque demand is determined according to said information on the position of the vehicle and said digitized cartographic data;

at step b1), said parameter which represents an imminent change in torque demand is furthermore determined according to at least one signal which represents the functioning conditions of the vehicle;

said signal which represents the functioning conditions of the vehicle comprises at least one of the following signals: a signal which represents the speed of the vehicle, a signal which represents the state of the turn signal lights of the vehicle, a signal which represents the activated or deactivated state of a cruise control of the vehicle;

said quantity of energy is determined by adding the energy consumption of the heat engine to the energy consumption of the electric motor, multiplied by an equivalence factor which represents the relative cost of electrical energy compared with heat energy for said vehicle; and said quantity of energy is furthermore determined according to the frequency of rotation of the wheels of the vehicle and/or with a total torque demanded at the wheels.

DETAILED DESCRIPTION OF AN EMBODIMENT EXAMPLE

The description that will follow with reference to the attached drawings, given as non-limitative examples, will bring true understanding of what comprises the invention and how it can be embodied.

Figure 5:
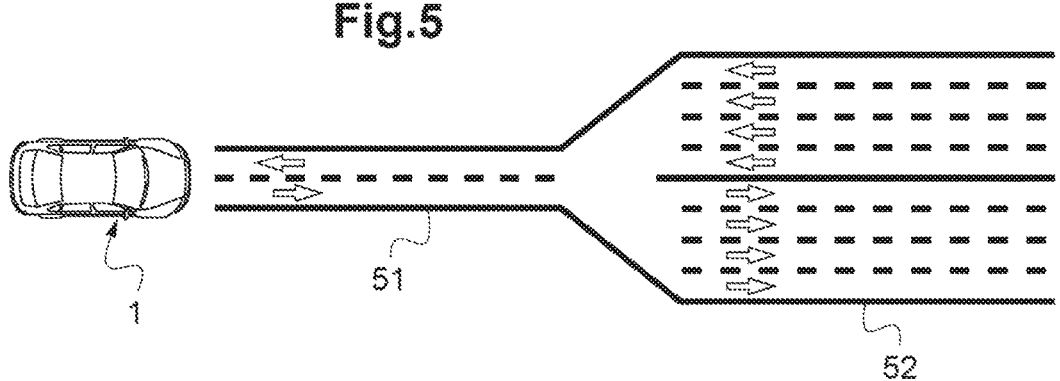

On the attached drawings:

FIG. 1 diagrammatically shows steps of a method for energy management in a hybrid vehicle according to the invention, FIG. 2 is a diagrammatic view of a first road configuration in which a motor vehicle is likely to decelerate, FIG. 3 is a diagrammatic view of a second road configuration in which a motor vehicle is likely to decelerate, FIG. 4 is a diagrammatic view of a third road configuration in which a motor vehicle is likely to decelerate, and FIG. 5 is a diagrammatic view of a fourth road configuration in which a motor vehicle is likely to accelerate.

An example of a method for energy management in a hybrid motor vehicle 1 (FIG. 2) according to the invention is explained below.

This vehicle 1 comprises a power plant including a heat engine and an electric motor suitable for being coupled with driving wheels of the vehicle 1 via a transmission device, according to at least two transmission modes, one of which is currently in use.

These transmission modes here comprise:

at least one hybrid transmission mode, wherein the heat engine and the electric motor are both coupled with the driving wheels of the vehicle 1, and at least one all electric transmission mode, wherein the electric motor alone is coupled with the driving wheels of the vehicle 1.

Each transmission mode corresponds here to a division of torque between the heat engine and the electric motor, and to a traction kinematics mode.

The electric motor and the heat engine can both contribute, in variable proportions, to the total torque produced by the power plant in order to satisfy a torque demand on the part of the driver.

Each division of torque between the heat engine and the electric motor is associated here with a value of a first control variable u1, for example a scalar variable which represents said division of torque.

On the other hand, each traction kinematics mode here designates:
- a choice of coupling one or both engines/motors with the driving wheels of the vehicle 1 via the transmission device, and
- for each engine/motor to be coupled with the driving wheels of the vehicle 1, a value of the gear ratio between this engine/motor and the driving wheels of the vehicle 1.

As an example, the traction kinematics mode can correspond to a situation in which the electric motor and the heat engine are both coupled to the driving wheels of the vehicle 1, respectively with a gear ratio equal to 5 and 4.

Each traction kinematics mode is associated here with a value of a second control variable u2, for example a vectorial variable which represents said traction kinematics mode.

Each transmission mode is therefore associated here with a value of this first control variable u1, and with a value of this second control variable u2.

The values of these first u1 and second u2 control variables can be used here directly by the power plant, or, here, by an electronic control unit of the power plant, to control the functioning of the electric motor, of the heat engine and of the transmission device of the latter.

During such a method for energy management according to the invention, a) a quantity of energy H which represents the energy consumption of the power plant is determined, and b) one of said transmission modes is selected according to this quantity of energy H.

In a noticeable manner, according to the invention, at step b), b1) a parameter CHG is determined which represents an imminent change in torque demand at the wheels of the vehicle 1 (block 10 of FIG. 1), b2) a correction factor COR of said quantity of energy H is determined, according to the transmission mode currently in use and according to said parameter CHG which represents an imminent change in torque demand (block 11 of FIG. 1), b3) a corrected quantity of energy HCOR is determined which is equal to the sum of said quantity of energy H plus said correction factor COR (block 12 of FIG. 1), and b4) the transmission mode is selected in order to minimize said corrected quantity of energy HCOR (block 13 of FIG. 1).

During step a), the quantity of energy H which represents the energy consumption of the power plant is determined, in accordance with the formula F1 below, by adding an energy consumption Conso_th of the heat engine and an energy consumption Conso_batt of an electric battery powering the electric motor, the energy consumption Conso_batt of the electric battery being weighted by multiplying it by an equivalence factor S:

$$H = \text{Conso\_th}(Cth, Wth) + S \cdot \text{Conso\_batt}(Celec, Welec, SOE) \quad \text{(F1)}$$

The energy consumption Conso_th of the heat engine is equal to the product of the mass flow of fuel consumed Mcarb, multiplied by the lower calorific value PCI of the fuel:

$$\text{Conso\_th}(Cth, Wth) = \text{Mcarb}(Cth, Wth) \cdot PCI \quad \text{(F2)}$$

The lower calorific value PCI of the fuel makes it possible to convert a mass flow of fuel, expressed in grams per second, to a consumed power, expressed in Watt.

The mass flow of fuel Mcarb is determined on the basis of fuel flow cartography, according to a functioning point of the heat engine defined by a torque value Cth produced by the heat engine, and by an engine rpm Wth of this engine, which corresponds to the frequency or speed of rotation of the engine.

The energy consumption Conso_batt of the electric battery powering the electric motor is determined on the basis of cartography of the power absorbed or supplied by the electric motor, according to:
- a functioning point of the heat engine defined by a torque value Celec produced by the electric motor and by a motor power Welec of this motor, and
- a value which represents a state of energy SOE of this battery.

This state of energy SOE corresponds for example to the relation of the energy available in the battery divided by the rated energy for this battery, that is to say, by the maximum quantity of energy this battery can contain.

The energy consumption Conso_batt of this electric battery can have positive or negative values. Such negative values can be obtained for example during a regenerative braking phase during which a portion of the kinetic energy of the vehicle 1 is recovered in electrical form via the electric motor.

In an optional manner, the energy consumption Conso_batt of the electric battery powering the electric motor is also determined by taking into account the energy consumption of accessories of the vehicle 1, for example the energy consumption of illuminating devices of the vehicle.

The equivalence factor S weights the consumption of energy of electrical origin relative to the consumption of energy of thermal origin according to their relative cost. In other words, the equivalence factor S fixes the cost of energy of electrical origin relative to the cost of a corresponding mass of fuel. A low value of this equivalence factor S favors a consumption of the energy stored in electrical form by said electric battery. A high value of this equivalence factor S on the contrary favors a consumption of energy of thermal origin, which results in preserving the energy stored in electrical form by said electric battery, and even in recharging this battery.

The value of the equivalence factor S is determined here according to the state of energy SOE of the electric battery.

As a variant, the quantity of energy H which represents the energy consumption of the power plant is determined by directly adding an energy consumption of the heat engine to an energy consumption of an electric battery powering the electric motor, without weighting.

In practice here, at step a), a value of the quantity of energy H which represents the energy consumption of the power plant, is determined, for each transmission mode, according to the values of the first and second control variables u1, u2 corresponding to this transmission mode, as explained below.

This value of the quantity of energy H is furthermore determined according to:
- the frequency of rotation Froue at the driving wheels of the vehicle 1,
- the total torque Ctotal to produce at these wheels in order to satisfy the torque demand on the part of the driver, and
- the state of energy SOE of said electric battery.

The value of each of these functioning parameters of the vehicle 1 is determined by the equipment of the vehicle 1.

In effect, the vehicle 1 here comprises a sensor suitable for measuring the frequency of rotation Froue at the driving wheels.

The total torque Ctotal to produce at these wheels is determined in turn according to the torque demanded by the driver at the accelerator pedal or at the brake pedal. It will be noted that the total torque can have positive values, but also negative values, for example in braking phase.

Finally, the state of energy SOE of the electric battery powering the electric motor can be determined on the basis of electrical measurements concerning this battery, in accordance with any method known to the person skilled in the art.

The rpm Wth of the heat engine and the power Welec of the electric motor are determined for example in accordance with the following relations F3 and F4:

$$Wth = Rth(u2) \cdot Froue \quad (F3)$$

$$Welec = Relec(u2) \cdot Froue \quad (F4)$$

The value of the gear ratio Rth between the heat engine and the driving wheels of the vehicle 1, and the value of the gear ratio Relec between the electric motor and these wheels, are each determined on the basis of the value of the second control variable u2, since the latter represents a given traction kinematics mode.

The value of the torque Celec produced by the electric motor and that of the torque Cth produced by the heat engine are deduced:
- from the following relation F5

$$Ctotal = Rth(u2) \cdot Cth + Relec(u2) \cdot Celec \quad (F5)$$

and from the division of torque between the heat engine and the electric motor.

This division of torque is deduced from the value of the first control variable u1.

Here, for example, the first control variable u1 is equal to the relation of the torque produced by the heat engine at the driving wheels of the vehicle, divided by the total torque produced by the power plant at these wheels:

$$u1 = Rth(u2) \cdot Cth/Ctotal \quad (F6).$$

The relation F5 therefore effectively makes it possible to determine the value of the torque Celec produced by the electric motor and that of the torque Cth produced by the heat engine according to the values of the first and second control variables u1, u2, for a given value of the torque Ctotal to supply in order to satisfy the torque demand on the part of the driver of the vehicle 1.

Here, more particularly, during step a), for each transmission mode, an initial value of said quantity of energy H is determined which represents the energy consumption of the power plant.

At step b1), during which a parameter CHG is determined which represents an imminent change in torque demand, the following steps are performed:
- b11) a road configuration is identified which is likely to correspond to an increase or a decrease of the demanded torque, for example due to imminent acceleration or deceleration of the vehicle 1, according to information on the position of the vehicle 1 determined by a global positioning system, and according to digitized cartographic data,
- b12) the situation of the vehicle 1 is determined as a situation of effective increase or decrease of the torque demand, for example, a situation of effective imminent acceleration or deceleration, by combining data which represent the identified road configuration with signals which represent the functioning of the vehicle 1, in particular signals which represent an intention on the part of the driver to change direction and/or speed, and
- b13) the parameter CHG is determined which represents an imminent change in torque demand.

The global positioning system used during the sub-step b11) is for example a navigation system of the vehicle 1.

This navigation system makes it possible, for example, thanks to GPS or GMS (Global System for Mobile Communication) signals it receives, to determine said information on the position of the vehicle 1, here the geographic coordinates identifying the vehicle 1.

This navigation system also comprises said digitized cartographic data. These cartographic data describe in particular the network of traffic routes used by the vehicle 1. These cartographic data describe in particular the configuration of these traffic routes and indicate a corresponding maximum authorized speed VMA.

The vehicle 1 can therefore be localized on this network of traffic routes, for example by a process of matching its geographic coordinates and said digitized geographic data (map matching process). The precision of this localization of the vehicle 1 on this road network can be improved by taking into account odometric data of the vehicle 1, that is to say by taking into account the number of meters traveled by this vehicle from a given position.

The digitized cartographic data used in this navigation system are globally described as explained below.

Each road segment is described by an arc, to which data describing this road segment can be associated, such as:
- the maximum authorized speed VMA on this segment;
- the number of traffic lanes and the direction of traffic which corresponds to them;
- the functional category of the road, which indicates whether it is a segment of track, for example, or whether it is a segment of freeway or national highway; these different functional categories are classified here in ascending order, from the one corresponding to a track through to the one corresponding to a freeway; and
- optionally, the average speed of the vehicles present on this segment or on this road, these data originating for example from information on the state of the road traffic received by the navigation system from a telecommunications network.

Each arc is furthermore described by points, or nodes, situated along this arc. The position of each node is known, in particular the corresponding latitude, longitude and altitude. The nodes of an arc therefore make it possible to describe the shape of the road segment under consideration.

Each node can furthermore carry information relating to the properties of the corresponding road segment, at the node under consideration, such as for example:

the presence of a road sign at this node, for example a sign signaling a STOP;

a bend radius value RC of the road segment at this node; these data can thus inform of the presence of a tight bend, the presence of a level crossing or a speed bump at this node, the presence of an intersection at this node, the result of which for the navigation system is the fact that this node belongs to several arcs having different orientations.

The digitized cartographic data therefore comprise data describing the portion of road which faces the vehicle 1 and making it possible to identify, for the vehicle 1, a road configuration likely to correspond to an imminent increase or decrease of the demanded torque, generally linked with imminent deceleration or acceleration, but potentially linked with a change of slope of the road traveled by the vehicle 1 at constant speed.

This road configuration corresponds for example to a change of a property of the road traveled by the vehicle 1 or to a change of traffic conditions, such as:

a change of slope, a change of the number of traffic lanes, a change of direction corresponding to a tight bend or an intersection, a change of speed limit, an obligation to stop the vehicle 1, indicated for example by a road sign device, or passing from a zone not too busy with traffic to a zone busy with traffic, or vice-versa.

FIGS. 2 to 5 diagrammatically show four examples of road configurations in which the motor vehicle 1 is likely either to decelerate or to accelerate, and therefore to bring about a change in torque demand at the wheels.

In a first road configuration shown on FIG. 2, the motor vehicle 1 approaches an intersection 20 connecting the segment 21 on which the vehicle 1 is situated with three other road segments 22, 23, 24, of which one 22 is a prohibited direction, and of which the other two 22, 23 are authorized and have an orientation different from that of the segment 21 on which the vehicle 1 is situated.

In a second road configuration shown on FIG. 3, the motor vehicle 1 approaches an intersection 30 equipped, for the road segment 31 traveled by the vehicle 1, with a road sign 32 signaling a STOP.

In a third road configuration shown on FIG. 4, the motor vehicle 1 approaches an intersection 40 connecting four road segments 41, 42, 43, 44, each with two-way traffic, said intersection having no road panels or signs.

The first, second and third road configurations shown on FIGS. 2 to 4 are likely to lead to the vehicle 1 decelerating, and therefore to a decrease in torque demand at the wheels.

In a fourth road configuration shown on FIG. 5, the motor vehicle 1 is situated on a road segment 51 on which the maximum authorized speed is 90 kilometers an hour, extended by a segment of freeway 52 on which the maximum authorized speed is 90, 110 or 130 kilometers an hour depending on the meteorological conditions and the vehicle type.

The fourth road configuration of FIG. 5 is likely to lead to the vehicle 1 accelerating, and therefore to an increase in torque demand at the wheels. When one of the road configurations likely to correspond to imminent deceleration of the vehicle 1 is identified, sub-step b11) is further accompanied by:

determining a value of the distance D separating the current position of the vehicle 1 and the position of the road element likely to cause said deceleration, and determining the value of a passing speed VP recommended for the vehicle 1 at said road element.

This road element corresponds for example, in the case shown on FIG. 3, to the sign signaling the STOP, which should be marked at the corresponding intersection.

The value of this distance D is determined here on the basis of the current position of the vehicle 1 and the position of said road element, each identified on the network of traffic routes described by said cartographic data.

The value of the recommended passing speed VP corresponds, for some road configurations, to a given predetermined value. For example, it is taken here to be equal to 20 kilometers an hour for an intersection where the vehicle 1 will be obliged to branch off toward a road segment which is not a prolongation thereof, as shown in FIG. 2.

For other road configurations, the value of this recommended passing speed VP is determined on the basis of data describing the portion of road facing the vehicle 1, data which are available in the navigation system. These data can correspond for example to the maximum authorized speed VMA, or to the bend radius RC of the road, at the node identifying said road element likely to engender deceleration.

In particular, when this road element corresponds to a tight bend, the value of the recommended passing speed VP here is equal to a maximum speed Vmax(RC) associated with the bend radius RC of this bend, this speed being determined in accordance with the following formula F9:

$$VP = V\max(RC) = \lambda \cdot 3{,}6 \cdot \sqrt{g \cdot \mu_{max} \cdot RC} \quad (F9)$$

where:

the maximum speed Vmax(RC) associated with the bend radius RC of this bend is expressed in kilometers an hour, the bend radius RC of this bend is expressed in meters, $\mu_{max}$ is a coefficient of maximum lateral adherence of the vehicle, g is acceleration due to gravity, expressed in meters per second squared, and $\lambda$ is a coefficient of safety, positive and less than 1, whose value is predetermined such that this recommended passing speed VP is less than a limit speed beyond which the vehicle 1 would skid in this bend, so as to conserve a safety margin between the recommended passing speed VP and this limit speed.

Tables 1 and 2 below gather together examples of road configurations identified as likely to correspond to imminent acceleration or deceleration. The configurations described in these tables are given as examples; other road configurations encountered by a motor vehicle are likely to correspond to imminent acceleration or deceleration.

TABLE 1 examples of road configurations
likely to correspond to imminent acceleration

| code of the identified road configuration | description of the road configuration |
|---|---|
| A1 | The vehicle 1 is on an access slip road to a freeway (FIG. 5): for the current segment, the functional category is lower than that for a freeway, and VMA ≤ 90 km/h, for the following segment, the functional category is that of a freeway and VMA ≥ 90 km/h. |

TABLE 1-continued examples of road configurations
likely to correspond to imminent acceleration

| code of the identified road configuration | description of the road configuration |
|---|---|
| A2 | The vehicle 1 is on a road with the possibility of passing; for the current segment: 50 km/h ≤ VMA ≤ 90 km/h, the number of traffic lanes in the direction of travel is more than 2, and over the next 500 meters, there are no nodes corresponding to an intersection. |
| A3 | The vehicle 1 is on a freeway; for the current segment, the functional category is that of a freeway and VMA ≥ 90 km/h. |

TABLE 2 examples of road configurations likely to correspond to imminent deceleration

| code of the identified road configuration | description of the road configuration | Recommended passing speed VP |
|---|---|---|
| D1 | The vehicle 1 approaches a STOP (FIG. 3): the current segment comprises a node which corresponds to an intersection, and at which a STOP sign is indicated. | 0 |
| D2 | The vehicle 1 approaches an intersection obliging it to change direction (FIG. 2): the current segment comprises a node which corresponds to an intersection, the following authorized segments (not having a prohibited direction) have an orientation different from that of the current segment. | 20 km/h |
| D3 | The vehicle 1 approaches an intersection offering at least one possibility of changing direction (FIG. 4): the current segment comprises a node which corresponds to an intersection, at least one subsequent authorized segment has an orientation different from that of the current segment. | 20 km/h |
| D4 | The vehicle 1 is on an exit slip road from a freeway, approaching an exit. | equal to the VMA associated with this exit slip road |
| D5 | The vehicle 1 approaches a bend: the current segment contains a node for which a bend radius RC < 100 m is indicated. | equal to Vmax (RC) |
| D6 | The vehicle 1 approaches a traffic circle: the current segment contains a node corresponding to an intersection, and this segment corresponds to a traffic circle. | Vmax(RC) |

During the following sub-step b12), an evaluation is performed as to whether the situation of the vehicle 1 is a situation of effective increased or reduced torque demand, due for example to an effective imminent acceleration or deceleration situation.

For this purpose, data which represent the road configuration identified at the preceding sub-step b11) are combined with signals which represent the functioning of the vehicle 1, in particular signals which represent an intention on the part of the driver to change direction and/or speed.

Said data which represent the identified road configuration here comprise for example:
a code associated with this road configuration, indicated in tables 1 and 2 for the corresponding examples of road configurations,
a maximum authorized speed VMA in this road configuration, and
when the identified road configuration is likely to correspond to imminent deceleration of the vehicle 1, a value of the limit distance DLIM and a value of the recommended passing speed VP.

The signals which represent functioning conditions of the vehicle used for this purpose comprise here for example:
a signal which represents the speed V of the vehicle 1,
a signal which represents the state of the turn signal lights of the vehicle, namely: extinguished, hazard warning, right turn signal light active or left turn signal light active, and
a signal which represents the activated or deactivated state of a cruise control equipping the vehicle 1.

In the road configurations where the vehicle 1 travels on a freeway or on a road with a possibility of passing, which corresponds for example to the road configurations A3 and A2 of table 1, the fact that the left turn signal light is active indicates a probable intention on the part of the driver of the vehicle 1 to pass another vehicle. In this case, if the cruise control is inactive, the vehicle 1 is determined as being in a situation of effective imminent acceleration.

In contrast, when the vehicle 1 travels on a freeway, and its left turn signal light is active, but the cruise control is activated, it is considered here that the vehicle will be kept at a substantially constant speed, and it is therefore determined that the vehicle 1 is not in a situation of effective imminent acceleration.

On the other hand, in one of the road configurations where the vehicle 1 approaches an intersection offering at least one possibility of changing direction (FIG. 4), which corresponds for example to the configuration D3 of table 2, the fact that the left or right turn signal light is active indicates a probable intention on the part of the driver of the vehicle 1 to change direction. In this case, it is determined that the vehicle 1 is in a situation of effective imminent deceleration.

Furthermore, in one of the road configurations likely to correspond to imminent acceleration, when the speed V of the vehicle 1 is close to the maximum authorized speed VMA on the road segment traveled, it is determined at step b12) that the vehicle 1 is not in a situation of effective imminent acceleration, since it is not authorized substantially to increase its speed V.

In a comparable manner, in one of the road configurations likely to correspond to imminent deceleration, when the speed V of the vehicle 1 is close to the passing speed VP recommended in this road configuration, it is determined here that the vehicle 1 is not in a situation of effective imminent deceleration, since its speed is already sufficiently low to be suitable for the road configuration encountered.

Tables 3 and 4 below summarize, for the examples of road configurations described in tables 1 and 2, the conditions to verify in order to determine that the vehicle 1 is in a situation of effective imminent acceleration or deceleration.

TABLE 3 conditions to verify in order to determine that the vehicle 1 is effectively in a situation of effective imminent acceleration

| code of the identified road configuration | state of the turn signal lights | state of the cruise control | difference between the maximum authorized speed VMA on the segment traveled and the speed V of the vehicle 1 |
|---|---|---|---|
| A1 | any | any | VMA − V > 20 km/h |
| A2 | left turn signal light active | deactivated | any difference in speed |
| A3 | left turn signal light active | deactivated | VMA − V > 20 km/h |

TABLE 4 conditions to verify in order to determine that the vehicle 1 is effectively in a situation of effective imminent deceleration

| code of the identified road configuration | state of the turn signal lights | state of the cruise control | difference between the speed V of the vehicle 1 and the recommended passing speed VP |
|---|---|---|---|
| D1 | any | any | any difference in speed |
| D2 | any | any | V − VP > 20 km/h |
| D3 | left or right turn signal light active | any | V − VP > 20 km/h |
| D4 | right turn signal light active | deactivated | V − VP > 20 km/h |
| D5 | any | any | V − VP > 20 km/h |
| D6 | any | any | V − VP > 20 km/h |

The conditions described above, concerning the state of the turn signal lights, are given here for motor vehicle traffic on the right (such as traffic in France or Germany, for example). The person skilled in the art will be able to adapt them without difficulty to the case of motor vehicle traffic on the left (such as traffic in the United Kingdom or Japan, for example).

At sub-step b13), the parameter CHG is a variable here which is able to adopt three different values:
- a first value, for example 0, indicating probably keeping the torque demand at the wheels of the vehicle 1 at a substantially constant value, for example in the case of probably keeping the speed of the vehicle 1 on a flat road,
- a second value, for example 1, indicating an imminent increase in torque demand, due for example to imminent acceleration on a flat road, and
- a third value, for example 2, indicating an imminent decrease in torque demand, due for example to imminent deceleration on a flat road.

By default, the value 0 is attributed here to the parameter CHG.

When the situation of effective imminent acceleration has been determined during the preceding sub-step b12), and in a case where the road traveled is flat, the value 1 is attributed to the parameter CHG, and in fact:
- as soon as this situation of effective imminent acceleration is determined,
- and for a period shorter than a given maximum period.

Here, this given maximum period is less than 20 seconds.

When a period longer than this maximum period has elapsed since the situation of effective imminent acceleration was determined, the value 0 is once more attributed to the parameter CHG.

The period during which the value 1 is attributed to the parameter CHG, further to the determination of the situation of effective imminent acceleration, is limited in order to avoid keeping this value at 1 in a case where the driver of the vehicle finally decides not to accelerate.

When the situation of effective imminent deceleration is determined, and in a case where the road traveled is flat, the value 2 is attributed to the parameter CHG, and in fact:
- as soon as the distance D which separates the vehicle 1 from the road element responsible for said deceleration is less than a limit distance DLIM,
- and as long as this road element has not been passed.

This limit distance DLIM is determined according to the speed V of the vehicle 1; it is all the greater given that the speed V of the vehicle 1 is high.

This arrangement advantageously makes it possible to signal a situation of effective deceleration all the more distant from the decelerating element given that the speed V of the vehicle 1 is high.

Here for example, the following limit distance values are adopted:
- DLIM=300 meters where V=100 kilometers an hour, and
- DLIM=40 meters where V=30 kilometers an hour.

As a variant, the parameter CHG which represents an imminent change of speed of the vehicle is furthermore determined, during step b1), according to other data or signals relating to the functioning of the motor vehicle, for example data which represent images of the surroundings facing the vehicle 1, acquired by a camera equipping this vehicle and processed by means of suitable software.

The correction factor COR is determined so as to penalize switching of the power plant to a transmission mode that will become unfavorable in terms of energy after the change of speed of the vehicle.

More precisely, here, the correction factor COR is determined so as to penalize switching of the power plant to a kinematics mode offering a choice of one or both engines/motors which will become unfavorable in terms of energy after the change of speed of the vehicle.

Here, when the parameter CHG which represents an imminent change in torque demand indicates that a decrease in the demanded torque is imminent, and when the transmission mode currently in use is one of the all electric transmission modes, the correction factor COR corresponding to each hybrid transmission mode is then determined so as to be higher than that corresponding to any one of the all electric transmission modes.

The correction factor COR in this case is a factor which penalizes switching to one of the hybrid transmission modes. It favors keeping to one of the all electric transmission modes.

More precisely, in such a case, the correction factor COR here is:

equal to a fraction of the absolute value of said quantity of energy H:

$$COR = CAL1 \cdot |H| \quad (F7)$$

for each hybrid transmission mode, and equal to 0 for each all electric transmission mode.

For each hybrid transmission mode of the vehicle, the amplitude of the correction factor COR, relative to said quantity of energy H, is given by a first calibration constant CAL1, positive. Furthermore, the quantity of energy H is taken as an absolute value for determining this correction factor COR, such that the latter remains positive even when the quantity of energy H adopts a negative value, for example during a regenerative braking phase.

In a comparable manner, here, when the parameter CHG which represents an imminent change in torque demand indicates that an increase of the demanded torque is imminent and when the transmission mode currently in use is one of the hybrid transmission modes, the correction factor COR corresponding to each all electric transmission mode is then determined so as to be higher than that corresponding to any one of the hybrid transmission modes.

The correction factor COR is then a factor penalizing switching to one of the all electric transmission modes. It favors keeping the power plant in one of the hybrid transmission modes.

More precisely, in such a case, the correction factor COR here is:

equal to a fraction of the absolute value of said quantity of energy H:

$$COR = CAL2 \cdot |H| \quad (F8)$$

for each all electric transmission mode, and equal to 0 for each hybrid transmission mode.

The second calibration constant CAL2 is there again positive. Here, the first CAL1 and the second CAL2 calibration constants have the same value. As a variant, the first CAL1 and the second CAL2 calibration constants have different values.

On the other hand, here, when the situation in which the vehicle resides corresponds:

neither to an imminent increase of the demanded torque and to a hybrid transmission mode currently in use, nor to an imminent decrease of the demanded torque and to an all electric transmission mode currently in use, then the correction factor COR is determined such that it is identical for all the transmission modes.

More precisely, here, the correction factor COR is taken to be equal to 0 for each transmission mode, in such a case.

As a variant, the correction factor is determined according to any other method tailored:

so that the correction factor corresponding to each hybrid transmission mode is higher than the correction factor corresponding to any one of the all electric transmission modes when the parameter which represents an imminent change in torque demand indicates that a decrease of the demanded torque is imminent, and when the transmission mode currently in use is an all electric transmission mode, and so that the correction factor corresponding to each all electric transmission mode is higher than the correction factor corresponding to any one of the hybrid transmission modes when the parameter which represents an imminent change in torque demand indicates that an increase of the demanded torque is imminent, and when the transmission mode currently in use is a hybrid transmission mode.

Here, more particularly, during step b2), a value of said correction factor is determined for each transmission mode, this value being associated with this transmission mode.

During step b3), the corrected quantity of energy HCOR is determined by adding the quantity of energy H which represents the energy consumption of the vehicle 1 to said correction factor COR:

$$HCOR = H + COR \quad (F9)$$

Here, more particularly, a final value associated with said corrected quantity of energy HCOR is determined for each transmission mode.

During step b4), the transmission mode is selected in order to minimize said corrected quantity of energy HCOR.

For this, the transmission mode having the final value of the corrected quantity of energy HCOR is selected here, this value being associated with this weakest transmission mode.

The method for determining the quantity of energy H and the correction factor COR described above, combined with selecting a transmission mode by minimizing the corrected quantity of energy HCOR, advantageously allows the energy consumption of the vehicle 1 to be minimized, while avoiding changing transmission mode in a situation where this change would be followed almost immediately by a return to the initial transmission mode due to a change in demanded torque, for example due to a change of speed of the vehicle.

In particular, when a decrease of the demanded torque is imminent and the transmission mode currently in use is one of the all electric transmission modes, each hybrid transmission mode is advantageously unlikely to be selected here, since the correction factor COR associated with it is higher in this case than that associated with any one of the all electric transmission modes, and since said selection is made by minimizing said corrected quantity of energy HCOR.

In a comparable manner, when an increase of the demanded torque is imminent and the transmission mode currently in use is one of the hybrid transmission modes, one of the all electric transmission modes is advantageously unlikely to be selected here, since the correction factor COR associated with it is higher in this case than that associated with any one of the hybrid transmission modes.

In the example of FIG. 3, two transmission modes are considered:

an all electric transmission mode ZEV1, and
a hybrid transmission mode Hyb1.

In this example, the vehicle 1 approaches an intersection where it must mark a STOP (FIG. 3). This corresponds to one of the road configurations likely to correspond to deceleration. This road configuration is associated with a situation of effective deceleration, and therefore of decrease in the torque demanded at the wheels, whatever the values of said signals which represent the functioning conditions of the vehicle 1.

The transmission mode currently in use is the mode ZEV1.

In this first situation, the quantity of energy H which represents the energy consumption of the power plant has the following values:

for the transmission mode ZEV1:
H(ZEV1)=(1 gram per second).PCI
and for the transmission mode Hyb1:
H(Hyb1)=(0.9 gram per second).PCI Furthermore, in this initial situation, the parameter CHG which represents an imminent change in torque demand indicates here an imminent decrease of the demanded torque. The value of the first calibration constant CAL1 is 20% here, namely CAL1=0.2. In this initial situation, the correction factor COR and the corrected quantity of energy HCOR therefore have the following values:

for the transmission mode ZEV1:
COR(ZEV1)=0
HCOR(ZEV1)=(1 gram per second).PCI
and for the transmission mode Hyb1:
COR(Hyb1)=(0.18 gram per second).PCI and
HCOR(Hyb1)=(1.08 gram per second).PCI.

The corrected quantity of energy HCOR therefore has a smaller value for the transmission mode ZEV1 than for the transmission mode Hyb1.

The selected transmission mode is then the transmission mode ZEV1, and therefore it is this mode which continues to be used in the vehicle 1.

Subsequently, as the vehicle 1 approaches the intersection, its driver brakes and the speed of the vehicle 1 decreases. In this second situation, said quantity of energy H, the correction factor COR and the corrected quantity of energy HCOR have the following values:

for the transmission mode ZEV1:
H(ZEV1)=(−0.3 gram per second).PCI
COR(ZEV1)=0
HCOR(ZEV1)=(−0.3 gram per second).PCI
and for the transmission mode Hyb1:
H(Hyb1)=(0.1 gram per second).PCI
COR(Hyb1)=(0.02 gram per second).PCI and
HCOR(Hyb1)=(0.12 gram per second).PCI.

The selected transmission mode is then the transmission mode ZEV1, and therefore it is this mode which still continues to be used in the vehicle 1.

Therefore, thanks to the invention, selection of the hybrid transmission mode Hyb1 is avoided in the first situation. In effect, if this mode were to be selected, it would only be used for a very short time before returning to the all electric transmission mode ZEV1 in the second situation. Such rapid changes of transmission mode are perceived as annoying by the driver.

In a variant of this method for energy management according to the invention, it is furthermore envisaged, at step b2), when the parameter which represents an imminent change in torque demand indicates a decrease in the demanded torque linked with imminent deceleration, and when the transmission mode currently in use is one of the hybrid transmission modes, that the correction factor is determined such that it has, for one of the hybrid transmission modes which corresponds to a gear ratio of the heat engine lower than the gear ratio of the heat engine currently in use, a value higher than that associated with the transmission mode currently in use.

For a vehicle traveling at slow speed, the use of a high gear ratio is known for coupling a heat engine to wheels of this vehicle, such that this engine is used on a good functioning point. Whereas the use is known of a lower gear ratio when the speed of the vehicle is high.

The method for determining the correction factor corresponding to this variant advantageously allows a change of transmission mode to be avoided which would result in a reduction of the gear ratio of the heat engine even when the vehicle is about to decelerate. It is advantageous to avoid this change of transmission mode, as it would be followed almost immediately, due to the reduction in speed of the vehicle, by another change of transmission mode allowing a return to a high gear ratio of the heat engine.

The correction factor COR is determined here so as to penalize switching of the power plant to a kinematics mode having a gear ratio which will become unfavorable after the change in speed of the vehicle.

In an optional manner, it is furthermore envisaged in this variant: when the parameter which represents an imminent change in torque demand indicates an increase of the demanded torque linked with imminent acceleration, and when the transmission mode currently in use is one of the hybrid transmission modes, that the correction factor is determined so as to favor the selection of one of the hybrid transmission modes which corresponds to a gear ratio of the heat engine higher than the gear ratio of the heat engine currently in use.

This last arrangement advantageously allows a change of transmission mode to be induced which results in an increase of the gear ratio of the heat engine, that is to say to downshift when the vehicle is about to accelerate. The driving comfort is therefore further improved since the acceptable ratio is favored with the largest possible reserve of available torque.

The invention claimed is:

1. A method for energy management in a hybrid motor vehicle comprising a power plant that includes a heat engine and an electric motor suitable for being coupled with wheels of the vehicle via a transmission device according to at least two transmission modes, one of which is currently in use, the method comprising:
   a) determining a quantity of energy which represents the energy consumption of the power plant; and
   b) selecting one of said transmission modes according to the quantity of energy, wherein the selecting includes:
      b1) determining a parameter which represents an imminent change in torque demand at the wheels,
      b2) determining a correction factor of said quantity of energy according to the transmission mode currently in use and according to said parameter which represents an imminent change in torque demand,
      b3) determining a corrected quantity of energy which is equal to the sum of said quantity of energy plus said correction factor, and
      b4) selecting the transmission mode in order to minimize said corrected quantity of energy.

2. The method for energy management as claimed in claim 1, wherein:
- at a), an initial value of said quantity of energy is determined for each transmission mode, the quantity of energy representing the energy consumption of the power plant;
- at b2), a value of said correction factor associated with the transmission mode is determined for each transmission mode;
- at b3), a final value of said corrected quantity of energy associated with the same transmission mode is determined for each transmission mode; and
- at b4), the transmission mode is selected which has the lowest final value of the corrected quantity of energy associated with the transmission mode.

3. The method as claimed in claim 1, wherein each transmission mode is associated with a gear ratio and/or with a division of torque between the heat engine and the electric motor.

4. The method as claimed in claim 1, wherein said transmission modes include at least one hybrid transmission mode in which the heat engine and the electric motor are both coupled with the wheels of the vehicle, and an all electric transmission mode in which the electric motor alone is coupled with the wheels of the vehicle, and
- when the transmission mode currently in use is the all electric transmission mode and when said parameter determined at b1) represents an imminent decrease in torque demand, then, at b2), said correction factor is determined so as to have a higher value for the hybrid transmission mode than for the all electric transmission mode.

5. The method as claimed in claim 1, wherein said transmission modes include at least one hybrid transmission mode in which the heat engine and the electric motor are both coupled with the wheels of the vehicle, and an all electric transmission mode in which the electric motor alone is coupled with the wheels of the vehicle, and
- when the transmission mode currently in use is the hybrid transmission mode and when said parameter determined at b1) represents an imminent increase in torque demand, then, at b2), said correction factor is determined so as to have a higher value for the all electric transmission mode than for the hybrid transmission mode.

6. The method as claimed in claim 1, wherein said correction factor is proportional to said quantity of energy.

7. The method as claimed in claim 1, wherein the vehicle further comprises a global positioning system suitable for supplying information on a position of the vehicle and digitized cartographic data, and at b1), said parameter which represents the imminent change in torque demand is determined according to said information on the position of the vehicle and said digitized cartographic data.

8. The method as claimed in claim 1, wherein, at b1), said parameter which represents the imminent change in torque demand is determined according to at least one signal which represents functioning conditions of the vehicle.

9. The method as claimed in claim 8, wherein said signal which represents the functioning conditions of the vehicle comprises at least one of the following signals:
- a signal which represents a speed of the vehicle,
- a signal which represents a state of turn signal lights of the vehicle, and
- a signal which represents an activated or deactivated state of a cruise control of the vehicle.

* * * * *